Nov. 24, 1936.   E. E. HEWITT   2,061,905
FLEXIBLE DIAPHRAGM
Filed May 28, 1932
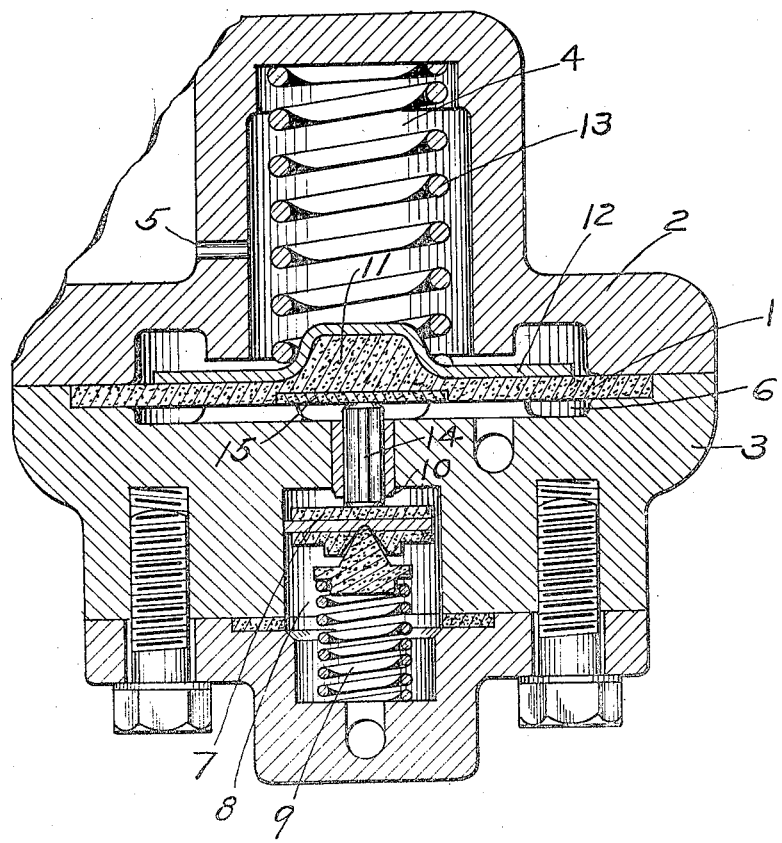
INVENTOR
ELLIS E. HEWITT
BY *Wm. M. Cady*
ATTORNEY Patented Nov. 24, 1936

2,061,905

UNITED STATES PATENT OFFICE 2,061,905

FLEXIBLE DIAPHRAGM

Ellis E. Hewitt, Edgewood, Pa., assignor to The Westinghouse Air Brake Company, Wilmerding, Pa., a corporation of Pennsylvania Application May 28, 1932, Serial No. 614,261

7 Claims. (Cl. 137—157)

This invention relates to flexible diaphragms and more particularly to the type adapted to operate a valve or the like.

In flexible diaphragms of the above type, it is the usual practice to secure a follower plate to the diaphragm for providing a wearing surface for engagement with a valve or the like. The follower plate is generally secured to one side of the diaphragm by bolting or riveting it to a retainer plate or washer on the opposite side. This build-up type of structure, therefore, requires the manufacture of several individual units which have to be assembled, and there is always the possibility that the assembly may be such that leakage of fluid under pressure from one side of the diaphragm to the opposite side might occur and such leakage might interfere with the proper functioning of the diaphragm.

One object of my invention is to provide a unitary diaphragm structure not requiring follower plates or the like for providing a wearing surface.

To attain this object, a hard rubber insert is molded into the diaphragm and provides a wearing surface adapted to engage and operate a valve stem or the like. In making the diaphragm, an insert of a different rubber mixture than is used in making a flexible diaphragm is properly positioned in the diaphragm mold and then the diaphragm and insert are cured together. In the curing or vulcanizing process, a bond is established between the insert and diaphragm for securely holding the insert in the diaphragm, and on account of the difference in the rubber mixtures used in the diaphragm and in the insert, the diaphragm is flexible after curing, whereas the insert is sufficiently hard to provide a satisfactory wearing surface. This improved construction does not materially increase the cost of manufacture of the diaphragm but does effect a considerable saving in cost over the built-up construction above described. Another advantage of this unitary structure is that leakage cannot occur as is possible with the built-up structure.

Another object of my invention is to provide an improved flexible diaphragm having a raised or boss-like portion adapted to extend into the end of a coil spring, so as to prevent lateral movement of the spring relative to the diaphragm.

In the accompanying drawing; the single figure is a diagrammatic view of a valve device embodying my improved type of flexible diaphragm.

As shown in the drawing, the flexible diaphragm 1 may be mounted between two portions 2 and 3 of a casing, the diaphragm 1 forming at one side a chamber 4 which may be vented through a port 5 and forming at the other side a chamber 6 which, under certain conditions, may be supplied with fluid under pressure. A poppet valve 7 is contained in a chamber 8 and a spring 9 is provided in said chamber for urging said poppet valve into engagement with a seat rib 10, so as to close communication from chamber 8 to chamber 6.

According to one feature of the invention, the diaphragm 1 is provided with a raised portion 11 in chamber 2. Mounted on said raised portion is a metallic plate 12 having a recess adapted to receive the raised portion of the diaphragm. One end of a spring 13 is fitted over the raised portion of the metallic plate 12 and the other end of said spring engages the casing, so that said spring exerts a pressure upon the diaphragm 1 tending to deflect said diaphragm outwardly and unseat the poppet valve 7, a fluted pin 14 being slidably mounted in a suitable bore in the casing and operatively connecting said diaphragm to said valve.

The raised portion 11 on the diaphragm is provided to prevent lateral movement of the metallic plate 12 on the diaphragm, while the spring fitting over the raised portion of the plate prevents shifting of the spring relative to the diaphragm.

As above described, the poppet valve 7 is adapted to be unseated by spring 13 through the medium of the operating pin 14. If the pressure of fluid in chamber 6 exceeds the opposing pressure of spring 13 on the diaphragm, the diaphragm will be deflected, so as to permit spring 9 to seat the poppet valve. It will thus be obvious that as the diaphragm is deflected to unseat the poppet valve 7 and then to permit seating of said poppet valve, wearing pressure is exerted on said diaphragm at the area of engagement with pin 14.

According to another feature of the invention, an insert or disc 15 of hard rubber is molded integral with the diaphragm 1 to provide a durable wearing surface for engagement by the pin 14. This insert 15 is bonded to the diaphragm 1, which is flexible, in the process of manufacture and thereby provides a unitary structure through which leakage of fluid under pressure is positively prevented.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A diaphragm comprising a relatively thin disc of flexible rubber extending continuously from rim to rim and adapted to be clamped around its edge, said disc having a raised portion centrally on one side thereof, a follower plate on said side of the disc and provided with a recess for receiving the raised portion of the diaphragm, the other side of the disc having a substantially continuous plane surface, a hard rubber insert countersunk centrally in said last named side directly opposite to said raised portion and having its face flush with the face of said flexible rubber disc.

2. A diaphragm comprising a relatively thin disc of flexible rubber extending continuously from rim to rim and adapted to be clamped around its edge, said disc having a raised portion centrally on one side thereof, a follower plate mounted on the raised portion and having a recess formed to receive the raised portion of said flexible rubber disc, and a hard rubber insert countersunk centrally in said last named side directly opposite said raised portion and having its face flush with the face of said flexible rubber disc and vulcanized simultaneously with the flexible rubber disc in the process of vulcanizing said diaphragm so as to provide a strongly bonded homogeneous structure, said insert providing a wear resisting surface for operatively engaging an independently movable valve stem or the like.

3. A diaphragm comprising a flexible rubber disc and a follower plate, said plate having a centrally raised portion forming a recess on the side thereof adjacent said disc, said flexible rubber disc having a raised portion centrally thereof fitting into said recess, and a hard rubber insert having a diameter greater than the diameter of said raised portion and countersunk centrally in the face of said flexible rubber disc directly opposite said raised portion having its face flush with the face of said flexible rubber disc, said insert providing a wear resisting surface for operatively engaging an independently movable valve stem or the like.

4. A diaphragm comprising a relatively thin disc of flexible rubber extending continuously from rim to rim and adapted to be clamped around its edge, one side of said disc having a substantially continuous plane surface, an insert of hard material countersunk centrally in said last named side and having its face flush with the face of said flexible rubber disc and vulcanized thereto in the process of vulcanizing said diaphragm so as to provide a strongly bonded structure, said insert providing a wear resisting surface for operatively engaging an independently movable valve stem or the like.

5. A diaphragm comprising a relatively thin disc of flexible rubber extending continuously from rim to rim and adapted to be clamped around its edge, said disc having a raised portion centrally on one side thereof, the other side of said disc having a substantially continuous plane surface, an insert of hard material countersunk centrally in said last named side directly opposite to said raised portion and having its face flush with the face of said flexible rubber disc.

6. A diaphragm comprising a flexible rubber disc having a raised portion centrally on one side thereof, a follower plate mounted on the raised portion and having a recess formed to receive the raised portion of said flexible rubber disc, an insert of hard material having a diameter greater than the diameter of said raised portion countersunk centrally in the face of said flexible rubber disc directly opposite said raised portion to provide a relatively thin area of flexible rubber material adjacent said raised portion and to provide a wear resisting surface of substantial area for operatively engaging an independently movable valve stem or the like.

7. A flexible diaphragm adapted to be clamped around its edge and consisting of a disc of flexible rubber extending continuously from rim to rim, and a hard rubber insert countersunk centrally in one face of said diaphragm and vulcanized simultaneously with the flexible rubber disc in the process of vulcanizing said diaphragm so as to provide a strongly bonded homogeneous structure, said insert providing a wear resisting surface for transmitting the motion of the diaphragm to a freely movable stem or the like.

ELLIS E. HEWITT.